United States Patent
Cofta

(10) Patent No.: US 8,165,565 B2
(45) Date of Patent: Apr. 24, 2012

(54) METHOD AND SYSTEM FOR RECURSIVE AUTHENTICATION IN A MOBILE NETWORK

(75) Inventor: Piotr L Cofta, Suffolk (GB)

(73) Assignee: British Telecommunications plc, London (GB)

( * ) Notice: Subject to any disclaimer, the term of this patent is extended or adjusted under 35 U.S.C. 154(b) by 891 days.

(21) Appl. No.: 12/161,806

(22) PCT Filed: Oct. 27, 2006

(86) PCT No.: PCT/GB2006/004033
§ 371 (c)(1),
(2), (4) Date: Jul. 23, 2008

(87) PCT Pub. No.: WO2007/085779
PCT Pub. Date: Aug. 2, 2007

(65) Prior Publication Data
US 2011/0045799 A1    Feb. 24, 2011

(30) Foreign Application Priority Data
Jan. 24, 2006    (EP) ................................. 06250370

(51) Int. Cl.
*H04M 1/66* (2006.01)
(52) U.S. Cl. .......... 455/411; 705/161; 705/170; 713/18; 713/44; 713/67; 713/325
(58) Field of Classification Search .................. 455/411; 380/227–286, 44–45, 259–264
See application file for complete search history.

(56) References Cited

U.S. PATENT DOCUMENTS

| 7,239,701 B1 | 7/2007 | Ogishi et al. |
| 2002/0012433 A1* | 1/2002 | Haverinen et al. ............ 380/247 |
| 2005/0100165 A1* | 5/2005 | Rose et al. .................... 380/270 |
| 2005/0190920 A1 | 9/2005 | Ahonen |
| 2005/0251681 A1 | 11/2005 | Robles et al. |
| 2007/0005971 A1 | 1/2007 | Leung et al. |
| 2007/0086591 A1* | 4/2007 | Blom et al. ................... 380/279 |

FOREIGN PATENT DOCUMENTS

| EP | 1 624 639 A1 | 2/2006 |
| WO | 00/02406 A3 | 1/2000 |

(Continued)

OTHER PUBLICATIONS

International Search Report for PCT/GB2006/004033 mailed Jan. 31, 2007.

(Continued)

*Primary Examiner* — Marcos Batista
(74) *Attorney, Agent, or Firm* — Nixon & Vanderhye PC

(57) ABSTRACT

Under a system referred to as GAA in the 3G protocol, authentication of devices in a network that is usually performed by a home subscriber server can be transferred to a third party element known as a bootstrapping server function. However, the use of a bootstrapping server function does not completely address the problem of reducing authentication traffic at the home subscriber server. Such a problem is alleviated by utilizing the original session key generated under GAA and using that key in a recursive process to authenticate and generate further session keys at other network elements. This generation of further keys can be performed independently of the home subscriber server, and thus reduces traffic at the home subscriber server.

11 Claims, 6 Drawing Sheets

FOREIGN PATENT DOCUMENTS

| | | |
|---|---|---|
| WO | 2004/079985 A1 | 9/2004 |
| WO | 2004/105340 A1 | 12/2004 |

OTHER PUBLICATIONS

European Telecommunications Standard Instituted, Universal Mobile Telecommunications System (UMTS): Generic Authentication Architecture (GAA); Generic bootstrapping architecture; *European Telecommunications Standards Institute*, vol. 3, 3-SA3, No. V720, Dec. 2005, XP014032875.

European Telecommunications Standard Instituted, Universal Mobile Telecommunications System (UMTS): 3G Security; Security architecture; *European Telecommunications Standards Institute*, vol. 3, 3-SA3, No. V700, Dec. 2005, XP014032863.

Office Action mailed Feb. 17, 2011, in U.S. Appl. No. 12/293,133.

Amendment filed Jun. 17, 2011, in U.S. Appl. No. 12/293,133.

Notice of Allowance mailed Aug. 4, 2011, in U.S. Appl. No. 12/293,133.

International Search Report issued May 10, 2007, in PCT/GB2007/000446.

\* cited by examiner

METHOD AND SYSTEM FOR RECURSIVE AUTHENTICATION IN A MOBILE NETWORK

This application is the U.S. national phase of International Application No. PCT/GB2006/004033 filed 27 Oct. 2006 which designated the U.S. and claims priority to European Patent Application No. 06250370.1 filed 24 Jan. 2006, the entire contents of each of which are hereby incorporated by reference.

TECHNICAL FIELD OF THE INVENTION

This APPLICATION relates to a method of authentication in communications network, in particular a method of authenticating a device in a cellular communications network by recursively generating session keys based on an initial shared secret key held by the device and the core network.

RELATED ART

Security in communication systems has always been important and mobile cellular communication systems have been no different. In early "first generation" analogue mobile phone systems, a third party could eavesdrop on the communications between a mobile terminal and the mobile network fairly easily over the radio interface. These problems were partly mitigated when "second generation" digital systems, such as GSM (Global System for Mobile communications), were adopted by mobile operators.

Security provisions, including authentication, under GSM are based upon a key sharing principle, where a smart card (a SIM card) is used to store a secret key that is been preloaded onto the card when the card is made. The secret key is thus shared a priori between the mobile phone and the network operator before any communication is initiated. The secret key forms the basis for all subsequent key generation used for authentication and ciphering. However, there are shortfalls in the GSM security provisions that mean it is not completely secure.

Under UMTS (Universal Mobile Telecommunications System), one of the "third generation" (3G) mobile communication systems, security provisions are based loosely on those under GSM, but with further enhancements. As in GSM, under UMTS a smart card (USIM) is used to store identification and security information, which includes the subscriber ID and a secret key K. This information enables a subscriber to connect with the network and make/receive calls securely. The method of authentication in UMTS using derived keys from this initial secret key is performed under the AKA (Authentication and Key Agreement) protocol. The security provisions in UMTS, including the AKA protocol, are set out in greater detail in 3GPP TS 33.102.

The process of mutual authentication between the HSS (Home Subscriber Server) of the home network, and the subscriber's USIM (universal subscriber identity module), is based on showing knowledge of the shared key K, which is made available only to the USIM and the HSS. During an authentication request phase, the HSS generates an authentication vector including a random number RAND and a network authentication token AUTN based on the shared key K. The random number RAND and the authentication token AUTN are transmitted to the subscriber's mobile terminal, or specifically the USIM, which checks AUTN to authenticate the HSS and network, and then calculates an authentication response RES using a fixed algorithm based on RAND and the shared key K. The response RES is transmitted back to the HSS and if RES is equal to the response expected by the HSS based on its calculations, then authorization is completed and the USIM and the HSS will generate session keys, which can be used for data encryption and decryption during subsequent communications.

This architecture utilizing AKA protocol between the HSS and the USIM is a very valuable asset to network operators. This infrastructure can be leveraged to enable application functions in the network to establish shared keys and authenticate users. These application functions or servers can reside anywhere in the home network or a visited network. The protocol that has been adopted to allow a network operator to provide the "boot-strapping" of application security to authenticate a subscriber is set out in GAA (Generic Authentication Architecture). GAA is described in more detail in 3GPP TS 33.220.

FIG. 1 illustrates a simple network model 100 using the bootstrapping approach defined under GAA. Network 100 comprises an HSS 102, a BSF (bootstrapping server function) 104, a NAF (network application function) 106 and a UE (user equipment) 108. In network 100, the NAF 106, which is typically a service provider, and UE 108 are trying to authenticate each other and generate a session key to secure subsequent communications. The NAF 106 may provide services such as secure mail, electronic commerce and payment, access to a corporate network and such like.

In network 100, when the NAF 106 requires authentication of the UE 108, it does not need to make any request directly to the HSS, but instead uses the BSF 104. The BSF 104 acts as an intermediary authentication server and authenticates the UE 108 on behalf of the NAF 106, and also provides the necessary session keys.

As under the standard AKA protocol, authentication is based on an authentication vector sent by the HSS 102 to the BSF 104. The authentication vector includes challenge-response information based on the shared key K held at the HSS 102 and the USIM in the UE 108. The authentication vector also includes the two keys: a cipher key CK and an integrity key IK. These keys are generated only by the HSS 102 and can essentially be considered to be session keys used to secure communications following authentication. The authentication vector, and in particular, the challenge response information is used by the BSF 104 to authenticate the UE 108. In practice, the BSF 104 may request more than one authentication vector at any one time, and thus reduce the number to requests that have to be made to the HSS 102. There may also be further BSFs connected to the HSS 102.

However, the BSF 104 can only hold a limited number of authentication vectors and when these have all been used, the BSF 104 will need to request further authentication vectors from the HSS 102. In practice, the number of authentication vectors is expected to be between 1 and 32, with 2 to 4 being the most common. As such, while there are sound commercial reasons why the use of BSFs is advantageous, as well as technical ones related to reducing traffic at the HSS 102 from multiple requests from NAFs, the use of BSFs does not completely address the technical problem of reducing traffic at the HSS 102. Indeed, it is likely that as subscribers demand more services from the network, the number of NAFs providing those services will only increase with time, and thus the number of requests for authentication vectors at the HSS 102 by the BSF 104, and other BSFs, will inevitably increase as well. It is envisaged that while the current use of BSFs and GAA does alleviate the amount of authentication traffic experienced by the HSS 102, over time, there will come a point when the current system will cease to function efficiently due to problems caused by traffic overload.

Furthermore, the use of GAA as currently envisaged only extends the authentication process within the control of the mobile operator. The inventor has identified ways in which a system such as GAA could be extended and modified to cover more extensive applications.

SUMMARY

It is the aim of exemplary embodiments to address one or more of the above-stated problems.

According to one aspect of the present invention, there is provided a method of authentication in a communications network, the communications network comprising a home subscriber server, a first authentication entity, a first application entity and a user device, wherein a shared secret key is stored at the home subscriber server and the user device, and wherein the method comprises the steps of:

(i) generating at the first authentication entity a first network session key based on the secret key stored at the home subscriber server, and generating a first user session key based on the secret key stored at the user device, wherein the first network session key and the first user session key are the same;

(ii) transmitting the first network session key from the first authentication entity to the first application entity;

(iii) storing the first network session key at the first application entity and storing the first user session key at the user device; and wherein the method further comprises the steps of:

(iv) determining at a second authentication entity whether the first network session key and the first user session key are the same, and if they are the same, then (v) generating a second network session key at the second authentication entity, wherein the second network session key is based on the first network session key stored at the first application entity, and generating a second user session key at the user device based on the first user session key stored at the user device, wherein the second network session key and the second user session key are the same.

Typically, the home subscriber server and the authentication entity are controlled by the mobile network operator. As such, in the past, every time an application entity requires authentication and secure communications with the user device, it must make a request to the authentication entity and/or the home subscriber server. However, in embodiments of the present invention, repeat requests to the authentication server and/or the home subscriber server can be avoided by reusing the original session key, Ks, supplied by the authentication entity to the application entity. Thus traffic to the home subscriber server and the authentication entity are kept to a minimum. Furthermore, additional functionality and robustness is afforded to the application entity and other elements requiring authentication with the user device that are not under the direct control of the operator of the home network in which the home subscriber server and the authentication server reside.

Preferably, the method further comprises the step of (vi) transmitting the second network session key from the second server entity to a second application entity, and using the second session key to secure communications between the second application entity and the user device.

Step (iv) may comprise using the first network session key to derive a challenge response pair and using that challenge response pair to determine if the first user session key is the same as the first network session key.

The challenge response pair may be derived by the first application entity and said challenge response pair may be transmitted to the second authentication entity.

Communications in step (vi) may be secured by using the second session keys to encrypt and decrypt data transmitted between the second application entity and the user device.

Preferably, the communications network is a mobile cellular communications network.

The authentication entities may be bootstrapping server functions, and the application entities may be network application functions.

Preferably, the generating of session keys is performed under the generic authentication architecture.

According to another aspect of the present invention, there is provided a method of authentication in a communications network, the communications network comprising a home subscriber server, a first authentication entity, a first application entity, a core network and a user device, wherein a shared secret key is stored at the home subscriber server and the user device, and wherein the core network comprises at least the home subscriber server and the first application entity, said method comprises the steps of:

(i) generating a first user session key based on the secret key stored at the user device, and generating in the core network a first network session key based on the secret key stored at the home subscriber server, and wherein the first network session key and the first user session key are the same;

(ii) transmitting the first user session key from the user device to the first application entity;

(iii) storing the first user session key at a first application entity and storing the first network session key in the core network; and wherein the method further comprises the steps of:

(iv) determining at a second authentication entity whether the first network session key and the first user session key are the same, and if they are the same, then (v) generating a second user session key at the second authentication entity, wherein the second user session key is based on the first user session key stored at the first application entity, and generating a second network session key at the core network based on the first network session key stored in the core network, wherein the second user session key and the second network session key are the same.

BRIEF DESCRIPTION OF THE DRAWINGS

For a better understanding of the present invention reference will now be made by way of example only to the accompanying drawings, in which.

DESCRIPTION OF PREFERRED EMBODIMENTS

The present invention is described herein with reference to particular examples. The invention is not, however, limited to such examples.

Figure 1:
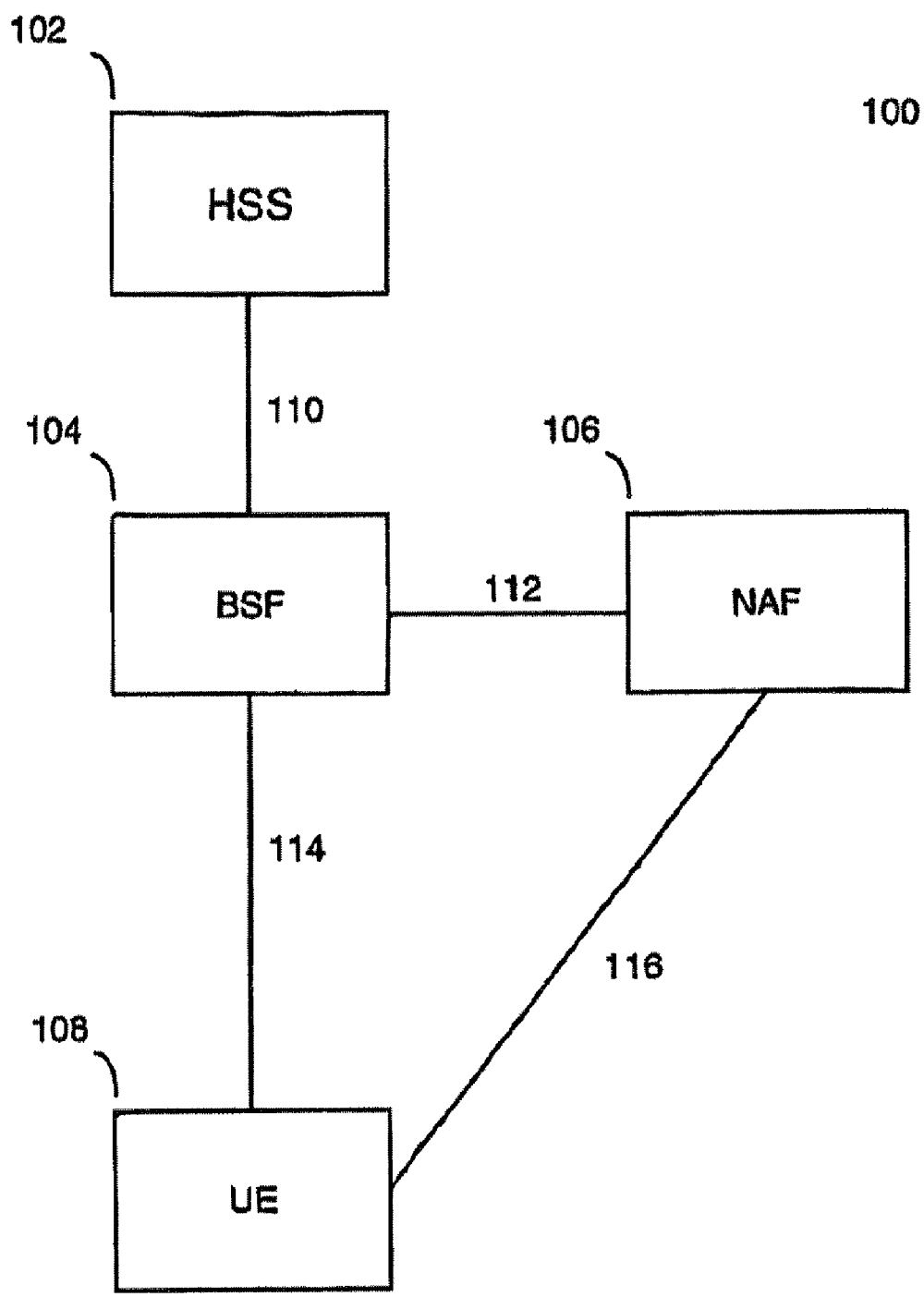
FIG. 1 is a simple network diagram incorporating bootstrapping.

FIG. 1 illustrates a simple 3G network 100 employing bootstrapping. The network 100 comprises a HSS (home subscriber server) 102, a BSF (bootstrapping server function) 104, a NAF (network application function) 106 and a UE (user equipment) 108. In the network 100, the BSF 104 and the UE 108 mutually authenticate each other using the AKA protocol. Session keys are agreed and are applied to communications between the UE 108 and the NAF 106. The NAF 106 may be a service provider, providing services such as secure mail, electronic commerce and payment, access to a corporate network and such like. The UE 108 may be any suitably configured device such as a mobile phone, a PDA or a laptop. The UE 108 contains a USIM (user subscriber identity module) which securely holds information relating to the user, such as the subscriber identity and authentication keys.

A person skilled in the art will recognize that other elements such as gateways, radio network controllers and other network elements may be found in the network 100. However, these elements have been omitted for the sake of simplicity.

The HSS 102 and the BSF 104 are located in the home mobile network of the UE 108. The NAF 106 may be located in the home mobile network of the UE 108 or in a visited mobile network. The HSS 102 and the BSF 104 can communicate over communications link 110. The BSF 104 and the NAF 106 can communicate over communications link 112. Communications links 110 and 112 are typically secure wired connections. The BSF 104 and the NAF 106 can communicate with the UE 108 over communications links 114 and 116 respectively. The communications links 114 and 116 usually includes at least in part a wireless air interface.

Authentication of the UE 108 and the network has to take place before secure communications between elements in the network and the UE 108 can take place. Note, insecure communications can occur before authentication is completed. Communications may be between the UE 108 and another device attached to the network, such as another user device, or an application server such as the NAF 106. Authentication is important for ensuring the integrity of the parties involved before communications start and also provides for the agreement, and exchange where appropriate, of keys for the encryption of data in the subsequent communications. The use of encryption keys is particularly important in the network when communications to and from the UE 108 are over a non-secure channel, either wholly or in part. In the network 100, communications link 114 and 116 may be wireless air interfaces, which are particularly susceptible to interceptions by third parties and must therefore be secured.

Authentication in the network is based on a shared secret key K, securely held on the USIM and the AuC (authentication centre) in the user's home network. The USIM takes the form of a smart card that is found in the UE 108, and the AuC is usually part of or connected to the HSS 102. For the sake of simplicity, the AuC and the HSS shall be referred to as a single combined entity, the HSS 102. Thus, before authentication begins, only the HSS 102 and the UE 108 have access to the shared key K.

Figure 2:
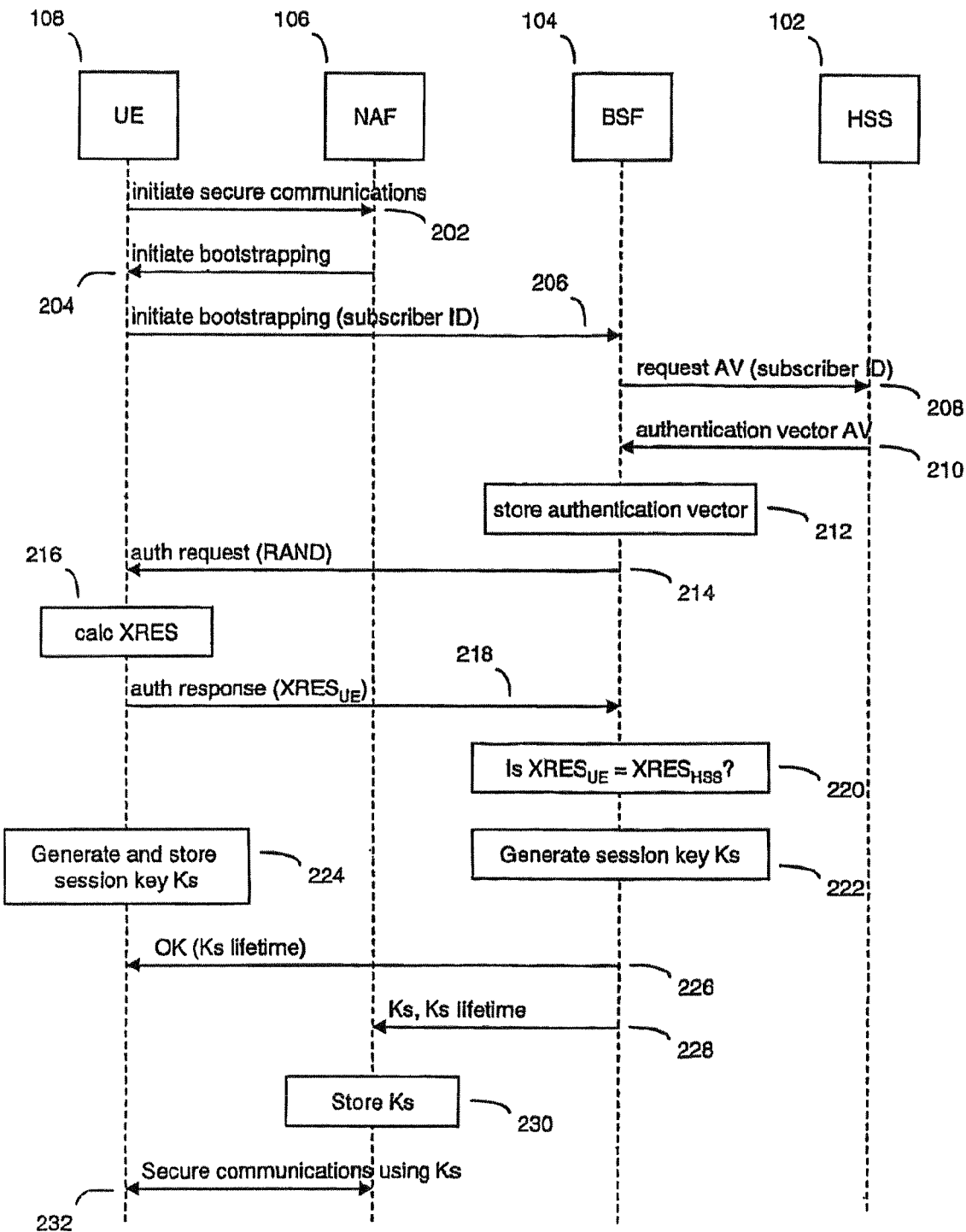
FIG. 2 is a message flow diagram illustrating bootstrapping.

The method of authentication in the network 100 will now be described with reference to FIG. 2, with references to the elements found in FIG. 1 made using like reference numerals.

Authentication between the UE 108 and the NAF 106 is initiated by the UE 108 sending a message to start communications in step 202. The NAF 106 sends a message back to the UE 108 to initiate bootstrapping as shown in step 204. Alternatively, the NAF 106 may initiate communications directly by omitting step 202, and starting communications directly with step 204.

The UE 108 then sends a message to initiate bootstrapping, which includes the subscriber ID of the USIM, to the BSF 104 in step 206. In step 208, the BSF 104 then sends a request message to the HSS 102 to retrieve at least one authentication vector AV corresponding to the subscriber ID received. The authentication vector AV is generated by the HSS 102 and includes a random number RAND, an expected response $XRES_{HSS}$ with which the BSF 104 can use to authenticate the UE 108, as well as some cipher and integrity keys, CK and IK, which are derived from the shared key K. The expected response $XRES_{HSS}$ is derived by the HSS from the generated random number RAND and the shared key K stored at the HSS using a predetermined algorithm. CK and IK are used later to generate session keys, or may themselves be used directly as session keys.

The authentication vector AV is sent from the HSS 102 to the BSF 104 in step 210 and then stored by the BSF 104 in step 212.

The HSS 102, may send more than one AV to the BSF 104. Thus, steps 208 to 212 may be omitted if the BSF 104 already holds at least one AV corresponding to the UE 108.

To authenticate the user, the BSF 104 sends the UE 108 the random number RAND in an authentication request message in step 214. In step 216, the UE then calculates an expected response based on the received random number RAND and the shared key K held by the USIM at the UE 108 using a predetermined algorithm. The expected response $XRES_{UE}$ calculated by the UE 108 is sent in an authorization response message to the BSF 104 in step 218.

Once the BSF 104 receives the authorization response message, BSF 104 checks the stored $XRES_{HSS}$, sent as part of the authorization vector AV from the HSS 102, with the $XRES_{UE}$ received from the UE 108, in step 220. If the values of $XRES_{HSS}$ and $XRES_{UE}$ match, then the UE 108 is authorized and the BSF 104 generates a session key Ks in step 222. The session key Ks is generated based on the shared key K held by the HSS 102 using a suitable key generating algorithm, and may be derived from the keys passed to the BSF 104 in the authentication vector AV. Similarly, the UE 108 also generates a session key Ks based the shared key K stored on the USIM and stores that session key Ks in a secure module on the UE 108 or on the USIM in step 224. Thus, the UE 108 and the BSF 104, after authentication, now share identical session keys Ks.

The BSF 104 then sends an OK response message to the UE 108 in step 226, which may include an indication of the lifetime of the session key Ks. In step 228, the BSF 104 then sends the session key Ks and the session key lifetime to the NAF 106. The NAF 106 and the UE 108 now share the same session key Ks with which they can encrypt data to enable secure communications between each other in step 232. If the key lifetime is used, then the session key Ks will be discarded after this lifetime. After this lifetime, any further communications should continue only after a repeated authentication process and generation of a new session key Ks.

Keys can be derived from an original key by one or more of the following methods: by selecting parts of the original key, by concatenating several keys, by applying the one-way (hash) function, by applying some logical conversions such as XOR or by applying cryptographic algorithms (e.g. DES) to the original key. A person skilled in the art will appreciate that other methods are also possible. The 3G specification does not mandate any specific functions for key derivation as long as the same function is used by both the HSS 102 and UE (or more specifically the USIM) 108.

Figure 3:
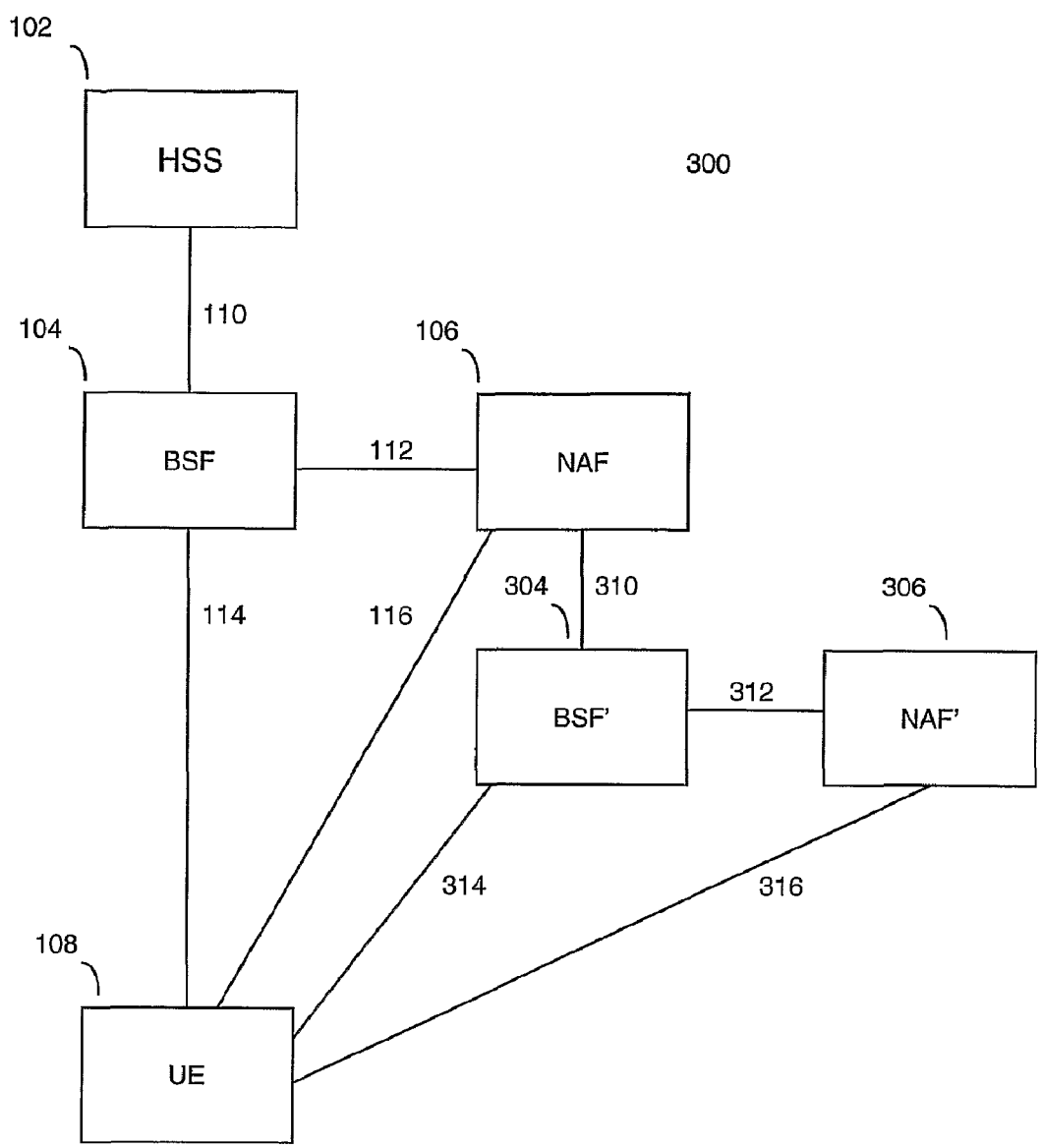
FIG. 3 is a network diagram illustrating an arrangement in an example of the present invention.

FIG. 3 illustrates a network 300 in an example of the invention. The network 300 includes all the elements from FIG. 1: the HSS 102, the BSF 104, the NAF 106 and the UE 108. The network 300 also includes the further elements of a BSF' 304 and a NAF' 306. The BSF' 304 is connected to the NAF 106 via communications link 310, and to the NAF' 306 via communications link 312. The BSF' 304 and NAF 306 are also connected to UE 108 over communications link 314 and 316 respectively. The communications links 314 and 316 may include at least in part a wireless radio interface.

The operation of the example of the invention in FIG. 3 will now be described with reference to FIG. 4.

Figure 4:
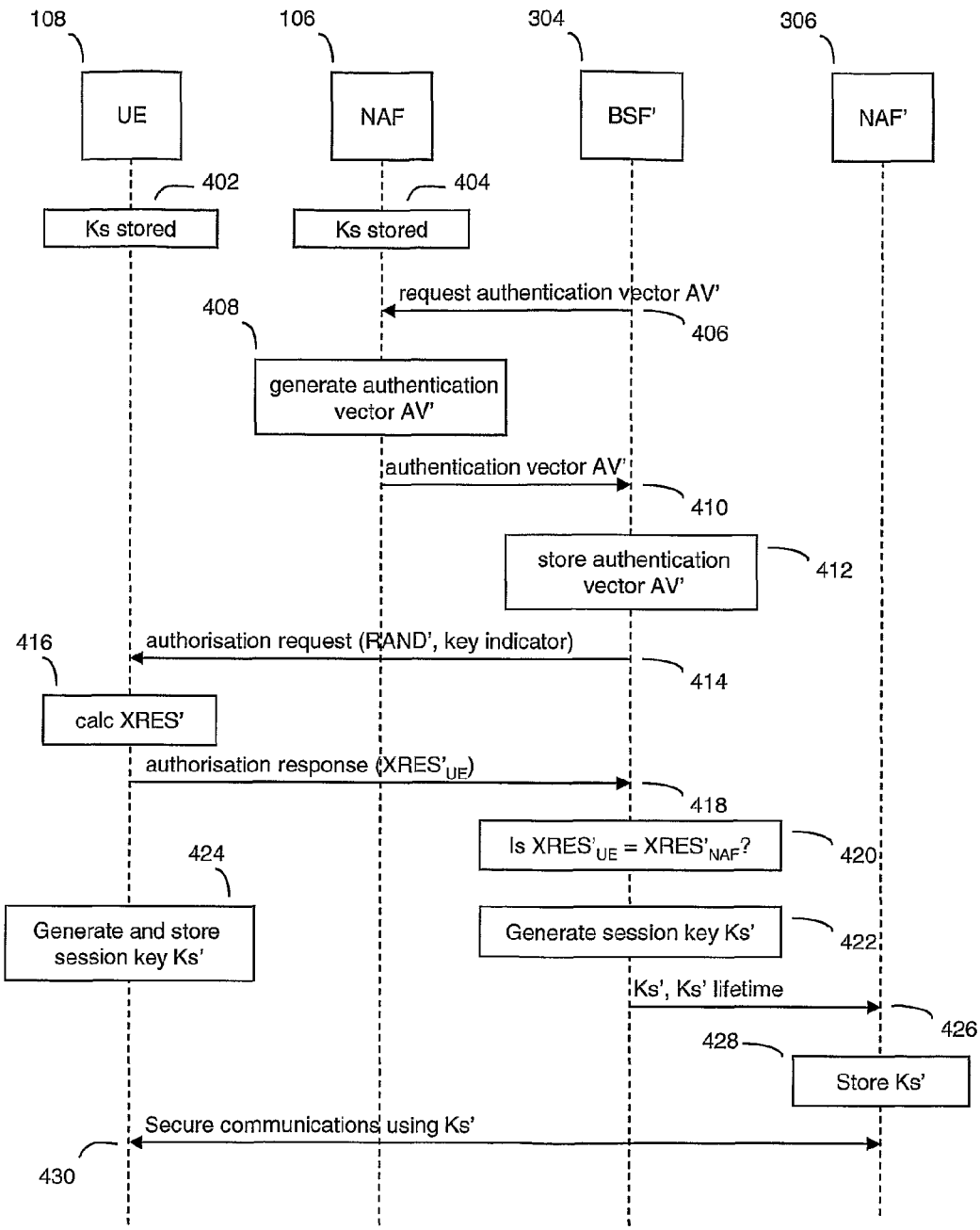
FIG. 4 is a message flow diagram of an example of the present invention.

FIG. 4 is a message flow diagram illustrating the process of key exchange between the BSF' 304, the NAF' 306 and the rest of the network 300. Firstly it is assumed that the NAF 106 and the UE 108 both hold a session key Ks enabling them to communicate with each other securely. The session key Ks is assumed to have been derived from a secret key K held at the UE 108 and the HSS 102, for example by following some or all of the steps shown in FIG. 2. The storage of the session key Ks is shown in step 402 and 404 of FIG. 4. Note that specifically, the session key Ks stored at the UE 108 can in practice be stored on the USIM in the UE 108.

In this example of the invention, when the further NAF' 306 requires authentication and key agreement with the UE 108, it does not make a request to the BSF 104, but makes a request the further BSF, BSF' 304, with an indication of the UE 108 it is attempting to authenticate and establish secure communications with. The BSF' 304 then sends a request message to the NAF 106 in step 406 to retrieve at least one authentication vector AV' corresponding to the UE 108. An authentication vector AV' is generated by the NAF 106 in step 408, which includes a random number RAND', an expected response $XRES'_{NAF}$ with which the BSF' 304 can use to authenticate the UE 108, as well as some cipher and integrity keys which are derived from the stored session key Ks. The expected response $XRES'_{NAF}$ is derived by the NAF 106 from the generated random number RAND and the session key Ks stored at the NAF using a suitable algorithm.

The authentication vector AV' is sent from the NAF 106 to the BSF' 304 in step 410 and then stored by the BSF' 304 in step 412.

The connection 312 between NAF' 306 and BSF' 304 is established a priori, so that NAP' 306 is always aware of which BSF' 304 it should submit its authentication requests to. Furthermore, the connection 312 is likely to be secured as it is used to convey sensitive information such as key Ks.

To authenticate the user, the BSF' 304 sends the UE 108 the random number RAND' and an indication that the authentication process is based on the previously generated session key Ks and not the shared key K. This indication may take the form of a simple flag or marker in the message. The random number RAND' and key indicator are sent in an authentication request message in step 414. In step 416, the UE 108 calculates an expected response $XRES'_{UE}$ based on the received random number RAND' and the stored session key Ks using a suitable algorithm. The expected response $XRES'_{UE}$ calculated by the UE 108 is sent in an authorization response message to the BSF' 304 in step 418.

Once the BSF' 304 receives the authorization response message, the BSF' 304 checks the stored $XRES'_{NAF}$, sent as part of the authorization vector AV' from the NAF 106, with the $XRES'_{UE}$ received from the UE 108, in step 420. If the value for $XRES'_{NAF}$ and $XRES'_{UE}$ match, then the UE 108 is authorised authorized and the BSF' 304 generates a further session key Ks' in step 422. The session key Ks' is generated based on the session key Ks stored at the NAF 106 using a suitable key generating algorithm. The cipher and integrity keys sent by the NAF 106 in the authentication vector AV', may be used as the session key Ks' or Ks' may be generated from the cipher and integrity keys, such as by concatenation or other method described previously. Similarly, the UE 108 also generates a session key Ks' based the stored session key Ks at the UE 108 in step 424. Thus, the UE 108 and the BSF' 304, after authentication, now share identical session keys Ks'.

The BSF' 304 then sends the newly generated session key Ks', and optionally a session key lifetime, to the NAF' 306. The NAF' 306 and the UE 108 now share the same session key Ks' with which can be used to encrypt data to enable secure communications between each other in step 230. If the key lifetime is used, then the session key Ks' will be discarded after this lifetime. Any further communications can then only continue after a repeated authentication process and generation of a new session key Ks'.

The timing of when Ks' is generated by the UE 108 and the BSF' 304 can occur at anytime during the above process, with the only requirement being that Ks' is available to the UE 108, and more specifically the USIM, as soon as authentication is completed.

In summary, as NAF 106 is in the possession of the first session key Ks that is identical with the first session key Ks held by the UE 108. Thus, the NAF 106 is able to effectively perform the function of an HSS (an HSS' of sorts) using Ks in a same manner that the HSS 102 uses the original shared secret K as a basis for authentication and generation of session keys.

In a further example of the invention, the BSF' 304 may not be needed and its functionality as outlined with reference to FIG. 4 may be provided within the NAF 106. In such an arrangement, the NAF 106 can effectively act as a BSF and authenticate the UE 108 with its stored session key Ks and then generate another session key Ks', which can be transmitted directly to the NAP' 306.

Typically the HSS 102 and BSF 104 are controlled by the mobile network operator. As such, every time the NAF 106 or other application server requires authentication and secure communications with the UE 108, it must make a request to the BSF 104 as set out in FIG. 2. However, by utilizing the examples of the invention described, it is possible to avoid repeated requests to the BSF 104 and hence to the HSS 102 by reusing the original session key Ks supplied by the BSF 104 to the NAF 106. Thus traffic to the HSS 102 and BSF 104 are kept to a minimum and additional functionality and robustness is afforded to the NAF 106 and other elements requiring authentication with the UE 108 that are not under the direct control of the operator of the home network in which the HSS 102 and BSF 104 reside.

Figure 5:
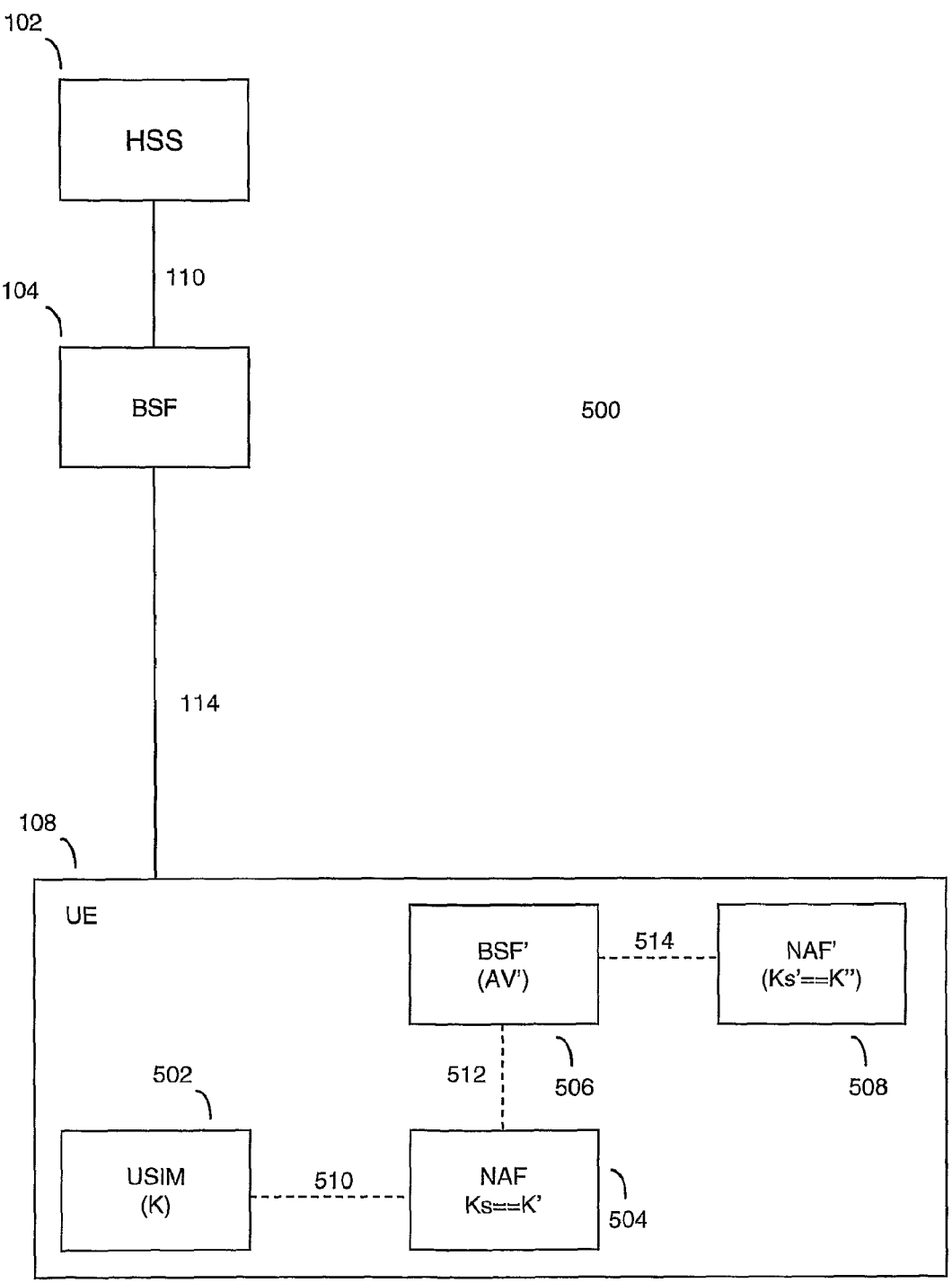
FIG. 5 is a network diagram of another example of the present invention with recursive authentication on the user equipment side.

It should also be appreciated that the same recursive process described above in relation to FIG. 4 could also be duplicated within the UE 108 or on the UE 108 side of the network, rather than on the core network side. FIG. 5 illustrates this recursive process occurring on the UE 108 side.

In FIG. 5, there is shown a network 500 comprising an HSS 102, a BSF 104, and a UE 108. However, in contrast to network 300 in FIG. 3, the network 500 is configured to effect the recursive authentication process on the UE 108 side rather than on the core network side as described earlier with reference to FIGS. 3 and 4.

The UE 108 is shown comprising a USIM 502, a NAF 504, a BSF' 506, and a NAF' 508. The UE 108 is authenticated by the network and a session key Ks is generated for securing communications in the same way as that outlined in steps 202 to 224 described above with reference to FIGS. 2 and 4. The difference between this network 500 and that of the network 300 in FIG. 3, is that authentication is initiated on the UE side with the UE 108 using the existing session key Ks to initiate authentication of the core network infrastructure and then using that existing session key Ks as a basis for generating a further session key Ks' with which communications can be secured between the UE 108 and the core network infrastructure.

Alternatively, the recursive process on the UE side could be used to generate a further session key Ks' that can be exported from the UE 108 to other locally attached devices, for example a PDA or multimedia player, so that the other device can communicate with the core network securely using this further session key Ks'.

The steps taken by the UE 108, and more specifically the NAF 504, BSF' 506 and NAF' 508 mirror steps 406 to 430 in FIG. 4, except that the NAF 106, BSF' 304 and NAF' 306 previously residing on the core network side, now form part of, or are associated with, the UE 108. And likewise, whereas authentication is initiated in FIG. 4 by the BSF' 304 on the core network side and directed towards the UE 108, in the example of FIG. 5, authentication is initiated by the UE 108 and directed towards the core network, or specifically directed towards a NAF in the core network.

Figure 6:
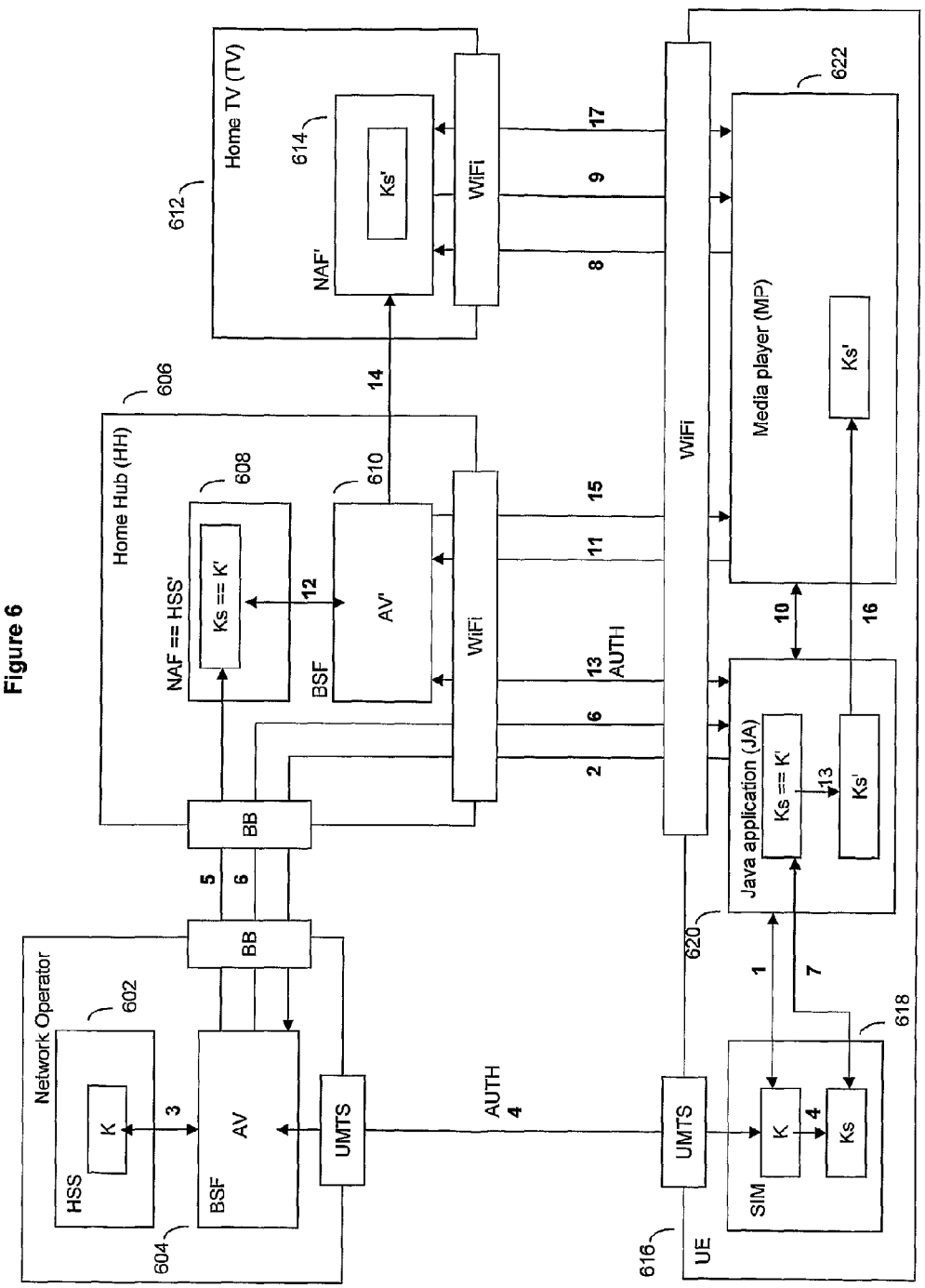
FIG. 6 is a network diagram of an example of the present invention applied to the user's home environment.

FIG. 6 illustrates one specific example of the use of the process outlined in FIG. 4 in combination with the arrangement of FIG. 5.

FIG. 6 illustrates an arrangement that might be used in a home environment comprising a HSS 602, a BSF 604, a home hub 606 comprising a NAF 608 and a BSF' 610, a home TV 612 comprising a NAF' 614, and a UE 616. The UE 616 further comprises three components: USIM module 618, a Java application JA 620 and a media player MP 622.

The HSS 602 and the BSF 604 form part of the network operator's core network, which in this example is a 3G UMTS network. A person skilled in the art will appreciate that the example is equally applicable to other types of cellular communications networks such as GSM. The BSF 604 is connected to the user's home hub 606 via suitable connection such as the broadband BB connection shown. The home hub 606 may be a broadband router or similar. The home hub 606 may also include a wireless capability such as WiFi transceiver enabling the home hub to connect to other network devices such as personal computers, laptops and PDAs wirelessly. The home hub 606 may form part of the user's home environment or home local area network, to which other devices may be attached. One example of a further device shown in FIG. 5 is the home TV 612. The home local area network would typically operate according to a suitable local area network protocol such as IEEE 802.3 Ethernet or IEEE 802.11 Wi-Fi.

The home TV 612 may utilize the connection to the home hub 606 to obtain data from the Internet via the broadband connection or to obtain other information from the network operator's core network. Examples of services may include video-on-demand, programming information, etc. The home TV 612 may also include a Wi-Fi transceiver which can be used to connect to the home hub, although a wired connection such as an Ethernet connection may also be used, and can also be used to connect to other devices.

Both the home hub 606 and the home TV 612 are able to connect to the UE 616 and specifically the Java application and the media player 622. The UE also has a Wi-Fi transceiver with which it can connect to the home hub 606 and the home TV 612 wirelessly.

In this example, the purpose is to authenticate the media player 622 with the home TV 612 so that data, such as premium TV or music content, can be transferred from the home TV 612 to the media player 622.

The underlying principle in this example follows that outlined in FIG. 4, namely that the UE and the core network are authenticated and a session key Ks is generated and shared between the NAF 608 in the home hub and the UE 616 as set out in the steps up to 404 in FIG. 4. By then applying the recursive technique described in the rest of FIG. 4, it is possible to authenticate and generate further session keys independently of the network operator, and specifically independently of the HSS 602 and the BSF 604.

The steps in this example will now be described with reference to the steps shown in FIG. 6.

Step 1. Java application JA 620 asks USIM 618 for the identity of the user and receives the network operator-related identity. At the same time JA 620 may also read from USIM 618 information related to the location of the preferred BSF to which authentication requests must be made.

Step 2. Using Wi-Fi, although in practice GSM and other communications protocols could be used, JA 620 connects to the home hub 606, and in turn to BSF 604 via the broadband connection with a request to initiate bootstrapping using the ID passed from the USIM 618 to the JA 620. This step is equivalent to step 206 in FIG. 2.

Step 3. BSF 604 requests and receives authentication vector AV from HSS 602. This step is equivalent to steps 208 and 212 in FIG. 2.

Step 4. BSF 604 performs the regular authentication over UMTS with UE/USIM. The result is that the USIM generates a session key Ks, which is also provided to the BSF 604 by the HSS 602. The mechanism for authentication and Ks key generation is the same as that described in steps 214 to 224 in FIG. 2.

Step 5. BSF 604 transmits Ks from the authentication vector AV to NAF 608, and optionally with a Ks lifetime, in the home hub 606 over the broadband connection. Equivalent to step 228 in FIG. 2.

Step 6. BSF 604 also responds to Java application 620 that the key generation has been successful, and optionally also includes a key lifetime. This is equivalent to step 226 in FIG. 2.

Step 7. Java application 620 requests and receives the Ks from USIM 618.

Following steps 1 to 7, the UE 616 and the core network are effectively bootstrapped and JA 620 and the home hub 606 have has access to Ks. Now the NAF 608 in the home hub 606 can effectively play the role of HSS' and the process continues as follows:

Step 8. Media player 622 makes a request to set up a secure session with the home TV 612, for example, to enable secure transfer of some premium TV content. The request is specifically directed to the NAF' 614 in the home TV 612.

Step 9. NAF' 614 responds by requesting the media player to initiate bootstrapping.

Step 10. Media player 622 makes a request to the Java application 620 for a user identity. Note that as the network operator is not needed, so that the user identity in this bootstrapping procedure can be different from the user identity in the step 1. This user identity is the one that is agreed upon between the NAF 608 and the Java application 620.

Step 11. Media player 622 makes a request to BSF' to initiate bootstrapping using the user identity received from the Java application 620 in step 10.

Step 12. BSF' 610 in the home hub requests and receives an authentication vector AV' from NAF 608, which is now acting effectively as HSS'. This is equivalent to steps 406 to 412 in FIG. 4.

Step 13. BSF' 610 authenticates the Java application in the standard manner as set out in steps 414 to 420 of FIG. 4 based on a challenge response method, which also mirrors that of step 4, but uses the session key Ks as the base key for authentication instead of the initial shared secret key K. At the same time, a further session key Ks' is generated based on Ks at the Java application 620 as well as at BSF" 610. The generation of the further session keys is equivalent to steps 422 and 424 in FIG. 4.

Step 14. BSF' 610 then passes Ks' to NAF' 614 in the home TV 612, potentially with a lifetime for the further session key Ks'. This is equivalent to step 426 in FIG. 4.

Step 15. BSF' 610 may also send an OK message to the media player 622, potentially with a lifetime for the further session key, Ks'.

Step 16. Media player 622 retrieves Ks' from the Java application 620.

Step 17. NAF' 614, and thus the home TV 612, and the media player 622 now share the same session key Ks'.

Therefore, using the method outlined in the steps above, the media player and the home TV can be authenticated. Furthermore, a session key, Ks', is generated based on the existing session key Ks, for use between the home TV 612 and the media player 622. This session key Ks' can be used to encrypt and decrypt any data transmitted between the home TV 612 and the media player 622. However, if the media player is lost or stolen, or if the further session key Ks' is somehow compromised in some way, then there is still no need to go back to the network operator, and specifically the HSS/BSF of the network operator, for a session key, as new ones can be generated based on the first session key Ks as described in the examples above.

In the arrangement in FIG. 6, the HSS 602 and BSF 604 can be considered as part of the user's home mobile/cellular network, which is also the network operator's network. The home hub 606 and the home TV 612 on the other hand can be considered as forming part of the user's home local area network, home Ethernet, home Wi-Fi or similar. Communication between the two different networks is provided by the broadband connection.

In summary, by adapting the method described in FIG. 4, this example of the invention in FIG. 6 provides for a session key Ks' to be shared between the media player 622 and the home TV 512, which can be used to encrypt communications over the otherwise non-secure Wi-Fi connection. The method has the advantage that it does not require the subscriber to manual input a matching set of keys at both the home hub 506 or the home TV 512 and the media player 522. Furthermore, even if the session key Ks' is compromised, a new one can easily be regenerated based on the first session key Ks. Furthermore, no request to HSS 102 is necessary once the first session key Ks has been determined so that a connection to the HSS over the broadband connection does not have to be open all the time.

It will be appreciated by a person skilled in the art that the invention can also operate with other devices instead of a media player or a home TV. Indeed, any device that requires authentication before allowing connection to the home hub either directly or to another element connected to the home hub, or that requires an easy to establish secure connection with the home hub can utilize this invention.

Also, other communications means can be used between the home hub and the multimedia player, not just a Wi-Fi connection. Indeed, any communications between the multimedia player and the home hub could be secured using the above method.

The above examples have been described with reference to a 3G environment, which includes intra-UMTS and UMTS-GSM. However, a person skilled in the art will appreciate that the methods can clearly be adopted by other types of communications network such as GSM, wireless LAN or the Internet.

It is noted herein that while the above describes examples of the invention, there are several variations and modifications which may be made to the described examples without departing from the scope of the present invention as defined in the appended claims. One skilled in the art will recognize modifications to the described examples.

The invention claimed is:

1. A method of authentication in a communications network, the communications network comprising a home subscriber server, a first authentication entity, a first application entity and a user device, wherein a shared secret key is stored at the home subscriber server and the user device, and wherein the method comprises:
  (i) generating at the first authentication entity a first network session key based on the secret key stored at the home subscriber server and generating a first user session key based on the secret key stored at the user device, wherein the first network session key and the first user session key are the same;
  (ii) transmitting the first network session key from the first authentication entity to the first application entity;
  (iii) storing the first network session key at the first application entity and storing the first user session key at the user device; and
  (iv) determining at a second authentication entity, based on communications from the user device and the first application entity, whether the first network session key and the first user session key are the same, and if they are the same, then
  (v) generating a second network session key at the second authentication entity, wherein the second network session key is based on the first network session key stored at the first application entity, and generating a second user session key at the user device based on the first user session key stored at the user device, wherein the second network session key and the second user session key are the same.

2. A method according to claim 1 further comprising:
  (vi) transmitting the second network session key from the second authentication entity to a second application entity, and using the second session key to secure communications between the second application entity and the user device.

3. A method according to claim 1, wherein step (iv) comprises using the first network session key to derive a challenge response pair and using that challenge response pair to determine if the first user session key is the same as the first network session key.

4. A method according to claim 3, wherein challenge response pair is derived by the first application entity and said challenge response pair is transmitted to the second authentication entity.

5. A method according to claim 2, wherein communications in step (vi) are secured by using the second session keys to encrypt and decrypt data transmitted between the second application entity and the user device.

6. A method according to claim 1, wherein the communications network is a mobile cellular communications network.

7. A method according to claim 5, wherein the authentication entities are boot strapping server functions.

8. A method according to claim 5, wherein the application entities are network application functions.

9. A method according to claim 6, wherein the generating of session keys are performed under authentication architecture.

10. A method of authentication in a communications network, the communications network comprising a home subscriber server, a first authentication entity, a first application entity, a core network and a user device, wherein a shared secret key is stored at the home subscriber server and the user device, and wherein the core network comprises at least the home subscriber server and the first application entity, said method comprises:
(i) generating a first user session key based on the secret key stored at the user device, and generating in the core network a first network session key based on the secret key stored at the home subscriber server, and wherein the first network session key and the first user session key are the same;
(ii) transmitting the first user session key from the user device to the first application entity;
(iii) storing the first user session key at the first application entity and storing the first network session key in the core network; and
(iv) determining at a second authentication entity, based on communications from the user device and the first application entity, whether the first network session key and the first user session key are the same, and if they are the same, then
(v) generating a second user session key at the second authentication entity, wherein the second user session key is based on the first user session key stored at the first application entity, and generating a second network session key at the core network based on the first network session key stored in the core network, wherein the second user session key and the second network session key are the same.

11. A system for authentication comprising a home subscriber server, a first authentication entity, a first application entity and a user device, wherein a shared secret key is stored at the home subscriber server and the user device, and wherein:
the first authentication entity is configured to generate a first network session key based on the secret key stored at the home subscriber server and transmit the first network session key to the first application entity;
the user device is configured to generate and store a first user session key based on the secret key stored at the user device, wherein the first network session key and the first user session key are the same;
the first application entity is configured to store the first network session key; and
a second authentication entity configured to determine, based on communications from the user device and the first application entity, whether the first network session key and the first user session key are the same, and if they are the same, then
the second authentication entity is configured to generate a second network session key, wherein the second network session key is based on the first network session key stored at the first application entity, and the user device is further configured to generate a second user session key based on the first user session key stored at the user device, wherein the second network session key and the second user session key are the same.

* * * * *